United States Patent
Kornilovich et al.

(10) Patent No.: US 7,394,961 B2
(45) Date of Patent: Jul. 1, 2008

(54) WAVEGUIDE HAVING LOW INDEX SUBSTRATE

(76) Inventors: Pavel Kornilovich, 1000 NE. Circle Blvd., Corvallis, OR (US) 97330-4239; Peter Mardilovich, 1000 NE. Circle Blvd., Corvallis, OR (US) 97330-4239

( * ) Notice: Subject to any disclaimer, the term of this patent is extended or adjusted under 35 U.S.C. 154(b) by 91 days.

(21) Appl. No.: 11/249,534

(22) Filed: Oct. 13, 2005

(65) Prior Publication Data
US 2007/0086715 A1    Apr. 19, 2007

(51) Int. Cl.
G02B 6/10 (2006.01)
(52) U.S. Cl. .......................... 385/129; 216/24
(58) Field of Classification Search ............. None
See application file for complete search history.

(56) References Cited

U.S. PATENT DOCUMENTS

| | | | |
|---|---|---|---|
| 3,653,739 A | | 4/1972 | Strack |
| 3,830,667 A | | 8/1974 | Carpenter |
| 3,850,762 A | | 11/1974 | Smith |
| 4,256,816 A | * | 3/1981 | Dunkleberger ............... 430/11 |
| 4,265,515 A | | 5/1981 | Kao |
| 4,302,074 A | | 11/1981 | Fleming, Jr. et al. |
| 5,281,305 A | * | 1/1994 | Lee et al. ............ 216/24 |
| 5,749,132 A | * | 5/1998 | Mahapatra et al. ......... 29/25.35 |
| 5,802,236 A | | 9/1998 | DiGiovanni et al. |
| 6,243,522 B1 | | 6/2001 | Allan et al. |
| 6,312,581 B1 | * | 11/2001 | Bruce et al. ............. 205/124 |
| 6,334,017 B1 | | 12/2001 | West |
| 6,444,133 B1 | | 9/2002 | Fajardo et al. |
| 6,445,862 B1 | | 9/2002 | Fajardo et al. |
| 6,625,364 B2 | | 9/2003 | Johnson et al. |
| 6,640,037 B2 | | 10/2003 | Gallagher |
| 6,728,439 B2 | | 4/2004 | Weisberg et al. |
| 6,788,864 B2 | | 9/2004 | Ahmad et al. |
| 6,829,421 B2 | | 12/2004 | Forbes et al. |
| 2001/0006567 A1 | * | 7/2001 | Yokoyama et al. ............ 385/14 |
| 2002/0164137 A1 | | 11/2002 | Johnson et al. |
| 2002/0176676 A1 | | 11/2002 | Johnson et al. |
| 2003/0031443 A1 | | 2/2003 | Soljacic et al. |
| 2003/0044158 A1 | | 3/2003 | King et al. |
| 2003/0044159 A1 | | 3/2003 | Anderson et al. |
| 2003/0049003 A1 | | 3/2003 | Ahmad et al. |
| 2003/0185505 A1 | | 10/2003 | Weisberg et al. |

(Continued)

FOREIGN PATENT DOCUMENTS

DE    3124522    1/1983

(Continued)

OTHER PUBLICATIONS

W.L. Xu et al. Optical transmission spectra of ordered porous alumina membranes with different thicknesses and porosities. Optical Materials vol. 28, No. 10, pp. 1160-1165, Jul. 2006.*

(Continued)

*Primary Examiner*—Sung Pak
*Assistant Examiner*—Mike Stahl

(57) ABSTRACT

An optical waveguide includes a porous substrate having pores of first width, a barrier layer having apertures aligned with the pore openings, and a core material layer adjacent the barrier layer. The apertures have a second width less than the first width.

27 Claims, 3 Drawing Sheets

U.S. PATENT DOCUMENTS

| | | |
|---|---|---|
| 2004/0013379 A1 | 1/2004 | Johnson et al. |
| 2004/0091224 A1 | 5/2004 | Baumberg et al. |
| 2004/0141702 A1 | 7/2004 | Fuflyigin et al. |
| 2004/0213536 A1* | 10/2004 | Zoorob et al. ............... 385/131 |
| 2004/0223715 A1 | 11/2004 | Benoit et al. |
| 2005/0128592 A1 | 6/2005 | Nishii et al. |

FOREIGN PATENT DOCUMENTS

| | | |
|---|---|---|
| EP | 0178831 | 4/1986 |
| EP | 0389274 | 9/1990 |
| EP | 1016621 | 7/2000 |
| EP | 1256829 | 11/2002 |

OTHER PUBLICATIONS

M. Saito et al. Optical waveguides fabricated in anodic alumina films. Optics Letters, vol. 19, No. 10, pp. 710-712, May 1994.*

H.F. Arrand et al. The application of porous silicon to optical waveguiding technology. IEEE Journal of Selected Topics in Quantum Electronics, vol. 4, No. 6, pp. 975-982, Nov./Dec. 1998.*

P.P. Mardilovich et al., "New and modified anodic alumina membranes", Journal of Membrane Science 98 (1995) 143-155.

P.E. Barclay et al., "Efficient input and output fiber coupling to a photonic crystal waveguide", Optics Letters, vol. 29, No. 7, Apr. 1, 2004, 697-699.

P. Mardilovich et al., "Hybrid micromachining and surface microstructuring of alumina ceramic", Microfabricated System and MEMS V., Proc. Electrochem. Soc., 2000-19, p. 33-42.

M. Schmidt et al., "Ultralow refractive index substrates-a base for photonic crystal slab waveguides", Appl. Phys. Lett., vol. 85, No. 1, Jul. 5, 2004, p. 16-18.

J. Randon et al., "Computer Simulation of Inorganic Membrane Morphology Part 3", Journal of Colloid and Interface Science 169, 335-341 (1995).

Venkataraman et al., Fabrication of 3D silicon photonic crystal structures using conventional micromachining technology, Proceedings of the SPIE, Jan. 2004, pp. 195-204.

Wehrspohn, Eletrochemically-prepared 2D and 3D photonic crystals, Photonic Crystals: Advances in Design, Fabrication and Characterization, May 6, 2005.

Notification of Transmittal of The International Search Report and The Written Opinion of the International Searching Authority dated Jan. 12, 2007.

* cited by examiner

WAVEGUIDE HAVING LOW INDEX SUBSTRATE

BACKGROUND

Photonic crystals (PCs) are a class of structure engineered materials that prohibit propagation of light modes of certain frequencies. Photonic crystal waveguides (PCWGs) are linear defects made in PCs that can propagate photonic modes at frequencies prohibited in bulk PCs. As a result, the electromagnetic field is tightly confined within the waveguides cross-section. This enables sharp bends and low-loss sharp splitters with low mode volumes inaccessible for conventional waveguides. PCWGs may also be engineered for a particular dispersion (e.g., a very low group velocity, a negative group velocity, or a rapidly changing group velocity.) These properties may be useful for the development of electro-optical integrated circuits.

A common type of PCWG is a quasi two-dimensional waveguide. A quasi two-dimensional waveguide is fabricated in a slab of optically transparent material and has essentially two dimensional patterns. Such structures are relatively easy to fabricate, however, light can be lost into the cladding above and below the waveguide. In the third dimension, the light is essentially index guided. Therefore, the index of refraction in both claddings should be as low as possible. The top cladding may be air with an index of refraction equal to one, which sets an upper limit for the parameter space available for designing low loss waveguides. If, however, the bottom cladding has an index of refraction greater than one, the parameter space will be limited by this index of refraction.

For these and other reasons, there is a need for the present invention.

SUMMARY

One aspect of the present invention provides an optical waveguide. The optical waveguide includes a porous substrate having pores of a first width, a barrier layer having apertures aligned with the pore openings, and a core material layer adjacent the barrier layer. The apertures have a second width less than the first width.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

Figure 1:
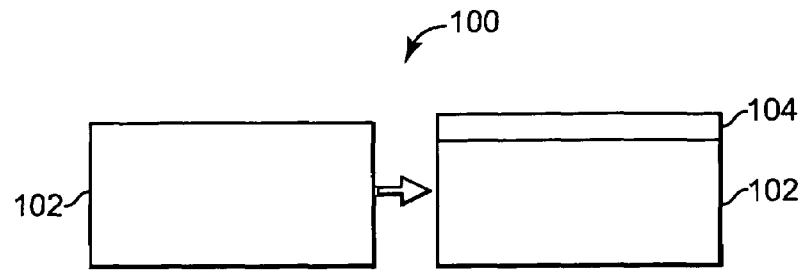
FIG. 1 is a diagram illustrating one embodiment of an electrochemical process for anodizing an aluminum substrate to generate a barrier layer.

FIG. 1 is a diagram illustrating one embodiment of an electrochemical process 100 for anodizing an aluminum substrate 102 to generate a barrier layer 104. Hereafter, the term "barrier layer" refers to a layer of material that is chemically resistant to some etchants that remove contaminated alumina. In one embodiment, such a material could be pure, non-contaminated alumina formed by electrochemical oxidation. The top portion of aluminum substrate 102 is placed in an electrolyte bath and a current is applied to form barrier layer 104 on aluminum substrate 102. The electrolyte includes citric acid ($C_6H_8O_7$), boric acid ($H_3BO_3$), ammonium pentaborate (($NH_4)_2B_{10}O_{16} \times 8H_2O$), ammonium tartrate ($H_4NO_2CCH(OH)CH(OH)CO_2NH_4$), or another suitable electrolyte. In one embodiment, barrier layer 104 is a relatively pure, dense, and chemically stable alumina layer that has a very low rate of dissolving in acidic etching materials commonly used for porous anodic alumina etching, such as phosphoric acid. The thickness of barrier layer 104 mainly depends on the voltage and duration of anodization at final voltage, and is approximately 1.3 nm/V.

Figure 2:
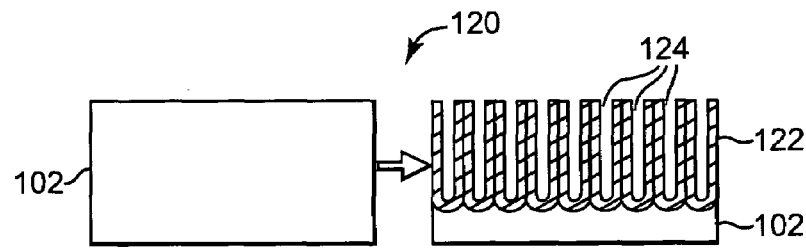
FIG. 2 is a diagram illustrating one embodiment of an electrochemical process for anodizing an aluminum substrate to generate porous anodic alumina illustrated in a vertical cross-section.

FIG. 2 is a diagram illustrating one embodiment of an electrochemical process 120 for anodizing aluminum substrate 102 to generate porous anodic alumina 122 illustrated in a vertical cross-section. Aluminum substrate 102 is anodized in an electrolyte to form porous anodic alumina barrier layer 122 in aluminum substrate 102. Porous anodic alumina barrier layer 122 has chemically stable (or more stable) alumina, predominantly without impurities.

Barrier layer 104 is a barrier type of anodic alumina. Porous anodic alumina barrier layer 122 is a thin layer of porous anodic alumina fabricated in chromic acid electrolyte and almost does not have electrolyte impurities and should have higher chemical stability to etching compared with impurity contaminated oxide prepared in electrolytes based on oxalic acid, $H_2SO_4$, etc. In other embodiments a barrier layer is formed of a combination of a barrier type of anodic alumina and a chemically more stable thin layer of porous oxide obtained in chromic acid electrolyte.

In one embodiment, the electrolyte used for generating porous anodic alumina barrier layer 122 is different from the electrolyte used for generating a barrier layer 104. The electrolyte includes sulfuric acid ($H_2SO_4$), phosphoric acid ($H_3PO_4$), oxalic acid ($H_2C_2O_4$), chromic acid ($H_2CrO_4$), or another suitable electrolyte. Porous anodic alumina 122 includes a plurality of pores 124. During the anodization process, the alumina at the bottom of each pore dissolve into the electrolyte and new alumina form deeper in aluminum substrate 102. The hole grows into a vertical pore, whose depth depends on the time and current of anodization. The sidewalls of the pores are covered with a relatively thick layer of contaminated alumina (e.g., contaminated by electrolyte ions, approximately 5-20 wt. %) followed by a thinner layer of relatively pure alumina similar to the barrier alumina of barrier layer 104. The relatively pure alumina has higher chemical stability (i.e., resistance to etching) than the contaminated alumina. The ratio of the thicknesses of the contaminated alumina to that of pure alumina depends on the electrolyte used.

Figure 3:
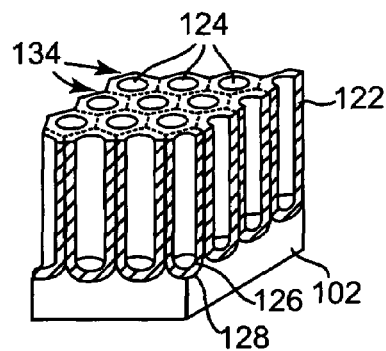
FIG. 3 illustrates a perspective view of one embodiment of porous anodic alumina.
Figure 4:
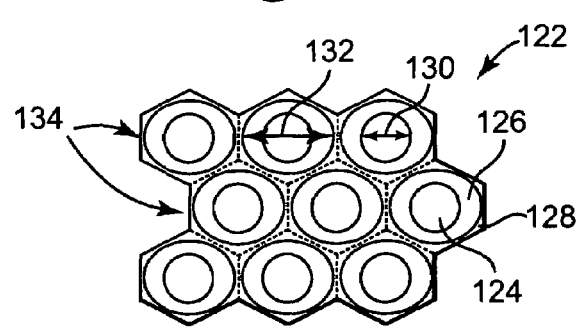
FIG. 4 illustrates a horizontal cross-sectional view of one embodiment of porous anodic alumina.

FIG. 3 illustrates a perspective view and FIG. 4 illustrates a horizontal cross-sectional view of one embodiment of porous anodic alumina 122. Pores 124 are self assembled in a regular hexagonal lattice of cells 134. The area occupied by pores 124 depends on the electrolyte used, and is approximately 10-15% for different example electrolytes. Pore 124 diameter 130 is determined mainly by a field-assisted dissolution process on the bottom of pores 124 and depends on properties of the electrolyte (e.g., nature of anion, concentration, pH, and temperature) and current density. The diameter 132 of each cell 134 is determined mainly by the formation voltage. For example different electrolytes, in one embodiment, the diameter 132 of each cell 134 is constant and approximately equal to 2.8 nm/V. In this embodiment, the ratio of the cell diameter 132 to the pore diameter 130 is approximately 3.3 for chromic acid, 4.9 for sulfuric acid, 3.0 for oxalic acid, and between 1.7 and 2.1 for phosphoric acid.

In relation to FIG. 4, it should be understood that the openings and the boundaries between the contaminated and pure alumina can be circular only approximately. In practice, both shapes may be slightly irregular but close to circle or hexagon. FIG. 4 simplifies the real system by showing the two shapes as ideal circles for clarity.

The ratio of the thicknesses of the relatively pure alumina portion 128 and that of the impurities contaminated alumina portion 126 is approximately 0.1 for oxalic acid based electrolytes. The ratio of the rate of solubilization of the impurities contaminated alumina portion 126 is approximately twenty-five times higher than that for the relatively pure alumina portion 128. The impervious barrier oxide layer at the bottom of each pore separates the electrolytes within the pores from the aluminum metal 102 during anodizing.

Figure 5:
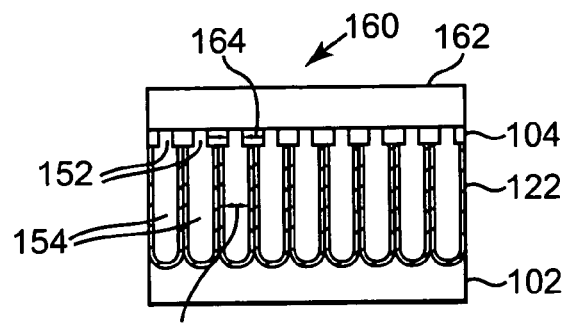
FIG. 5 illustrates a vertical cross-sectional view of one embodiment of a photonic crystal waveguide.

FIG. 5 illustrates a vertical cross-sectional view of one embodiment of a photonic crystal waveguide 160. Photonic crystal waveguide 160 includes an aluminum substrate 102, a porous anodic alumina layer 122, a barrier layer 104, and a core material layer 162. In one embodiment, porous anodic alumina layer 122 has a thickness less than approximately 2 μm. Core material layer 162 comprises silicon or another suitable core material. Barrier layer 104 includes apertures 152 aligned above pores 154. The diameter 164 of apertures 152 is less than the diameter 166 of pores 154. The process for fabricating photonic crystal waveguide 160 is illustrated and described below with reference to FIGS. 6-11.

Other embodiments of waveguides, other than photonic crystal waveguides, can also be implemented with an aluminum substrate, a porous anodic alumina layer, and a barrier layer. For example, one such embodiment is a ridge waveguide.

Figure 6:
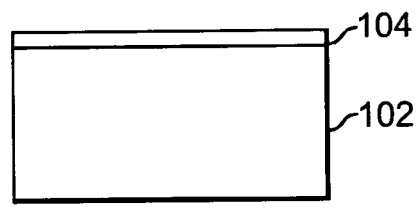
FIG. 6 illustrates a diagram illustrating one embodiment of an aluminum substrate with a barrier layer.

FIG. 6 is a diagram illustrating one embodiment of an aluminum substrate 102 with a barrier layer 104. Barrier layer 104 is formed on substrate 102 using electrochemical anodizing process 100 as previously described with reference to FIG. 1. In one embodiment, barrier layer 104 is formed in citric acid or any other suitable electrolyte commonly used for the fabrication of the barrier type of alumina.

Figure 7:
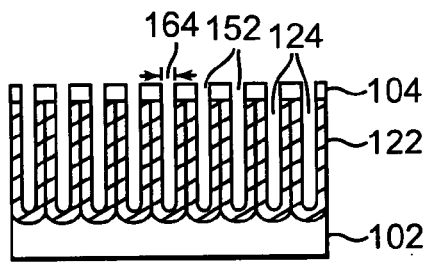
FIG. 7 illustrates a vertical cross-sectional view of one embodiment of the aluminum substrate and the barrier layer after forming a porous anodic alumina layer.

FIG. 7 illustrates a vertical cross-sectional view of one embodiment of aluminum substrate 102 and barrier layer 104 after forming a porous anodic alumina layer 122. In one embodiment, apertures 152 in barrier layer 104 and porous anodic alumina layer 122 are formed using electrochemical anodizing process 120 as previously described with reference to FIGS. 2-4. An anodizing voltage is applied that exceeds the final anodizing voltage that was used during the anodization to form barrier layer 104. Apertures 152 and pores 124 have a diameter 164 after this anodizing process.

Figure 8:
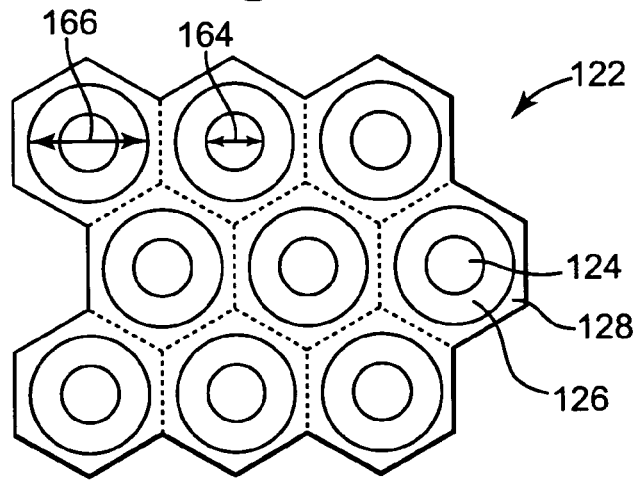
FIG. 8 illustrates a horizontal cross-sectional view of one embodiment of the porous anodic alumina layer.

FIG. 8 illustrates a horizontal cross-sectional view of one embodiment of porous anodic alumina layer 122. As previously described, a hexagonal lattice of deep narrow pores 124 are formed in aluminum substrate 102. The sidewalls of pores 124 include a contaminated alumina portion 126 and a relatively pure alumina portion 128. Pores 124 have a diameter 164 and contaminated alumina portions 126 have a diameter 166.

In relation to FIG. 8, it should be understood that the shape of the outside border of contaminated alumina can be circular only approximately. In practice, the shapes may be slightly irregular but close to circle or hexagon. FIG. 8 simplifies the real system by showing the shapes as ideal circles for clarity.

At this stage of this embodiment, porous anodic alumina layer 122 has a porosity of approximately 10%. As used herein, porosity is the ratio of the air volume to the total volume of porous anodic alumina layer 122.

Figure 9:
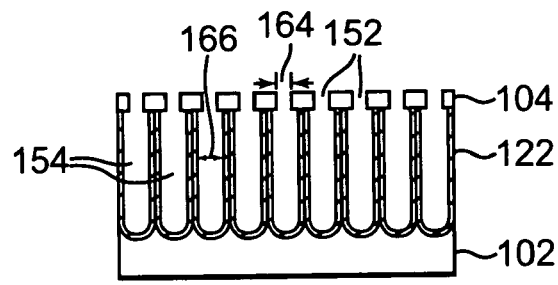
FIG. 9 illustrates a vertical cross-sectional view of one embodiment of the aluminum substrate, barrier layer, and porous anodic alumina layer after widening the pores of the porous anodic alumina layer.

FIG. 9 illustrates a vertical cross-sectional view of one embodiment of the aluminum substrate, barrier layer 104, and porous anodic alumina layer 122 after widening pores 124 of porous anodic alumina layer 122. Pores 124 are widened to form pores 154 by etching pores 124 with phosphoric acid. The phosphoric acid widens pores 124 in the bulk of the anodized layer by etching away contaminated alumina portions 126 to provide pore 154 diameter 166. The phosphoric acid does not significantly change diameter 164 of apertures 152 in barrier layer 104.

In another embodiment, barrier layer 104 and porous anodic alumina layer 122 are formed using another process. First, aluminum substrate 102 is anodized using electrochemical anodizing process 120 in an electrolyte where the proportion of the pore wall comprising relatively pure alumina is relatively higher. Second, anodization continues in another electrolyte, or in the same electrolyte at a different voltage, where the proportion of the pore wall comprising relatively pure alumina is relatively lower. Therefore, during the pore widening process, the top portion of aluminum substrate 102 forming barrier layer 104 is etched less than the inner portion of aluminum substrate 102 forming porous anodic alumina layer 122.

Examples of electrolytes for this alternative embodiment include: chromic acid in which almost all the alumina of the pore wall is relatively pure; phosphoric acid in which approximately 30-60% of the pore wall thickness comprises relatively pure alumina (e.g., approximately 60% for a low anodization voltage of approximately 20V, approximately 30% for a high anodization voltage of approximately 100V and higher); oxalic acid in which approximately 10% of the pore wall thickness comprises relatively pure alumina; and sulfuric acid in which approximately 5% of the pore wall thickness comprises relatively pure alumina.

Figure 10:
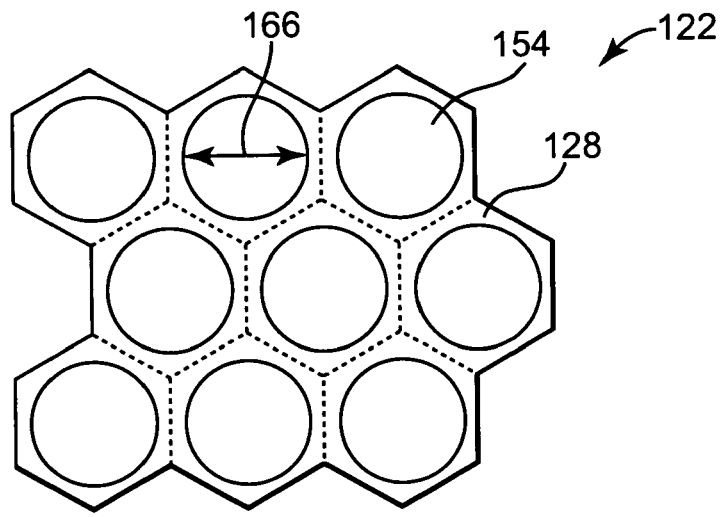
FIG. 10 illustrates a horizontal cross-sectional view of one embodiment of the porous anodic alumina layer after widening the pores.

FIG. 10 illustrates a horizontal cross-sectional view of one embodiment of porous anodic alumina layer 122 after widening of pores 124 to form pores 154. The contaminated alumina portion 126 has been removed, leaving the relatively pure alumina portion 128. At this stage of this embodiment, porous anodic alumina layer 122 has a porosity of approximately 70%. In one embodiment, pores 124 are further etched to further reduce the porosity of anodic alumina layer 122.

Figure 11:
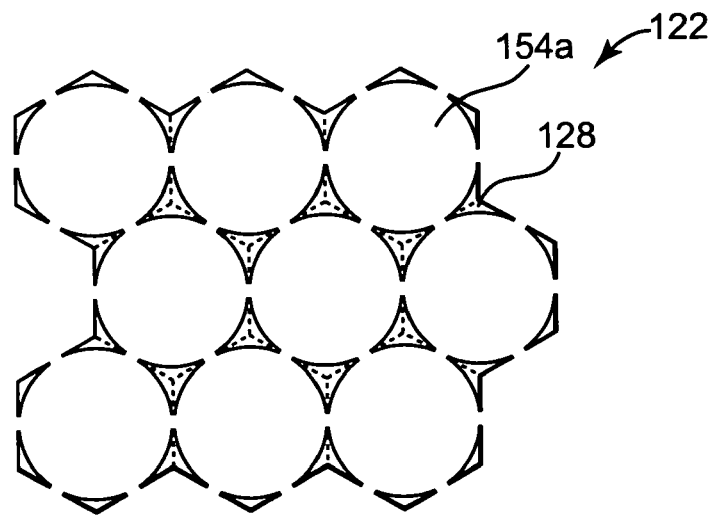
FIG. 11 illustrates a horizontal cross-sectional view of one embodiment of the porous anodic alumina layer after further widening the pores.

FIG. 11 illustrates a horizontal cross-sectional view of one embodiment of porous anodic alumina layer 122 after further widening of pores 154 to form pores 154a. The relatively pure alumina 128 is etched using phosphoric acid or another suitable etchant to achieve the desired porosity. In this embodiment, where the boundaries between the cells are triangular shaped, porous anodic alumina layer 122 has a porosity of between approximately 80-95%. In this embodiment, the index of refraction is less than 1.1. Core material 162 is then deposited on top of barrier layer 104 to provide the photonic crystal waveguide as illustrated in FIG. 5.

Embodiments of the invention provide a mechanically stable substrate with smooth top surface and a very low index of refraction less than 1.1. Such a substrate can enable fabrication of photonic crystal and other optical waveguides with minimal losses into the substrate. In addition, embodiments of the entire structure remain mechanically stable and do not have penetration of the core material into the pores.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An optical waveguide comprising:
a porous substrate having pores of a first width, wherein the porous substrate has a porosity within a range of approximately 70%-95%;
a barrier layer adjacent the porous substrate, the barrier layer having apertures aligned with the pore openings, the apertures having a second width less than the first width; and
a core material layer adjacent the barrier layer.

2. The optical waveguide of claim 1, wherein the porous substrate comprises anodic alumina.

3. An optical waveguide comprising:
a porous substrate having pores of a first width;
a barrier layer adjacent the porous substrate, the barrier layer having apertures aligned with the pore openings, the apertures having a second width less than the first width, wherein the barrier layer comprises alumina; and
a core material layer adjacent the barrier layer.

4. The optical waveguide of claim 1, wherein the barrier layer comprises a chemically stable oxide.

5. An optical waveguide comprising:
a porous substrate having pores of a first width;
a barrier layer adjacent the porous substrate, the barrier layer having apertures aligned with the pore openings, the apertures having a second width less than the first width; and
a core material layer adjacent the barrier layer, wherein the core material comprises silicon.

6. An optical waveguide comprising:
a porous substrate having pores of a first width, wherein the porous substrate has an index of refraction less than approximately 1.2;
a barrier layer adjacent the porous substrate, the barrier layer having apertures aligned with the pore openings, the apertures having a second width less than the first width; and
a core material layer adjacent the barrier layer.

7. The optical waveguide of claim 1, wherein the waveguide is a photonic crystal waveguide.

8. An optical waveguide comprising:
a porous substrate having pores of a first width:
a barrier layer adjacent the porous substrate, the barrier layer having apertures aligned with the pore openings, the apertures having a second width less than the first width; and
a core material layer adjacent the barrier layer, wherein the waveguide is a ridge waveguide.

9. The optical waveguide of claim 1, wherein the porous substrate has a thickness less than approximately 2 µm.

10. A method of fabricating a waveguide, the method comprising:
forming a barrier layer on a substrate with a first electrolyte;
forming apertures through the barrier layer and pores in the substrate aligned with the apertures with a second electrolyte;
widening the pores of the substrate with an etchant; and
depositing core material on the barrier layer.

11. The method of claim 10, wherein forming the barrier layer on the substrate comprises forming the barrier layer on the substrate by anodization with one of citric acid, boric acid, ammonium pentaborate, and ammonium tartrate.

12. The method of claim 10, wherein forming apertures through the barrier layer and pores in the substrate comprises forming apertures through the barrier layer and pores in the substrate by anodization with one of sulfuric acid, phosphoric acid, oxalic acid, and chromic acid.

13. The method of claim 10, wherein forming apertures through the barrier layer and pores in the substrate comprises forming apertures through the barrier layer and pores in the substrate to provide a porosity within a range of approximately 10%-15%.

14. The method of claim 10, wherein forming apertures through the barrier layer and pores in the substrate comprises forming pores having sidewalls comprising a contaminated alumina layer.

15. The method of claim 10, wherein widening the pores of the substrate comprises widening the pores of the substrate with an etchant.

16. A method of fabricating a waveguide, the method comprising:
forming a chemically stable aluminum oxide layer on an aluminum substrate;
forming apertures through the chemically stable aluminum oxide layer and pores in the substrate aligned with the apertures, wherein sidewalls of the pores comprise a contaminated alumina portion and a relatively pure alumina portion adjacent the contaminated alumina portion;
etching the contaminated alumina portion of the sidewalls; and
depositing core material on the chemically stable aluminum oxide layer.

17. The method of claim 16, further comprising:
partially etching the relatively pure alumina portion of the sidewalls to form triangular shaped borders between the pores.

18. The method of claim 16, wherein forming the chemically stable aluminum oxide layer comprises anodizing the aluminum substrate in an electrolyte bath.

19. The method of claim 18, wherein anodizing the aluminum substrate comprises anodizing the aluminum substrate in one of citric acid, boric acid, ammonium pentaborate, and ammonium tartrate.

20. The method of claim 16, wherein forming the apertures through the chemically stable aluminum oxide layer and the pores in the substrate comprises electrochemically forming the apertures through the chemically stable aluminum oxide layer and the pores in the substrate by submerging the aluminum substrate in an electrolyte bath.

21. The method of claim 20, wherein submerging the aluminum substrate in the electrolyte bath comprises submerging the aluminum substrate in one of sulfuric acid, phosphoric acid, oxalic acid, and chromic acid.

22. The method of claim 16, wherein etching the contaminated alumina portion of the sidewalls comprises etching the contaminated alumina portion with phosphoric acid.

23. A method of fabricating a waveguide, the method comprising:
anodizing a substrate to form pores having walls comprising a first proportion of a first material to form a barrier layer;
anodizing the substrate to extend the pores having walls comprising a second proportion of the first material, wherein the second proportion is less than the first proportion;
etching the pores; and
depositing core material on the barrier layer.

24. The method of claim 23, wherein anodizing the substrate to form the barrier layer comprises anodizing the substrate to form the barrier layer in a first electrolyte, and wherein anodizing the substrate to extend the pores comprises anodizing the substrate to extend the pores in a second electrolyte.

25. The method of claim 24, wherein anodizing the substrate to form the barrier layer comprises anodizing the substrate to form the barrier layer in an electrolyte at a first voltage, and wherein anodizing the substrate to extend the pores comprises anodizing the substrate to extend the pores in the electrolyte at a second voltage.

26. The method of claim 23, wherein the substrate comprises an aluminum substrate.

27. The method of claim 23, wherein the first material comprises alumina.

* * * * *

UNITED STATES PATENT AND TRADEMARK OFFICE
CERTIFICATE OF CORRECTION

PATENT NO. : 7,394,961 B2 Page 1 of 1
APPLICATION NO. : 11/249534
DATED : July 1, 2008
INVENTOR(S) : Pavel Kornilovich et al.

It is certified that error appears in the above-identified patent and that said Letters Patent is hereby corrected as shown below:

In column 6, line 15, in Claim 8, delete "width:" and insert -- width; --, therefor.

Signed and Sealed this

Eighteenth Day of November, 2008

JON W. DUDAS
*Director of the United States Patent and Trademark Office*